(12) United States Patent
Oehr et al.

(10) Patent No.: US 8,888,909 B2
(45) Date of Patent: Nov. 18, 2014

(54) METHOD FOR UPGRADING COMBUSTION ASH

(75) Inventors: Klaus H. Oehr, Surrey (CA); Gary A. Cyr, Alamo, CA (US); Travis Janke, North Vancouver (CA); Claudio I. Arato, Vancouver (CA); Roderick O. McElroy, Vancouver (CA)

(73) Assignee: Provectus Engineered Materiels Ltd., Vancouver (CA)

( * ) Notice: Subject to any disclaimer, the term of this patent is extended or adjusted under 35 U.S.C. 154(b) by 265 days.

(21) Appl. No.: 13/513,158

(22) PCT Filed: Dec. 2, 2010

(86) PCT No.: PCT/IB2010/003077
§ 371 (c)(1),
(2), (4) Date: May 31, 2012

(87) PCT Pub. No.: WO2011/067656
PCT Pub. Date: Jun. 9, 2011

(65) Prior Publication Data
US 2012/0234211 A1   Sep. 20, 2012

Related U.S. Application Data

(60) Provisional application No. 61/266,297, filed on Dec. 3, 2009.

(51) Int. Cl.
| | | |
|---|---|---|
| *C04B 18/08* | (2006.01) | |
| *B01D 47/00* | (2006.01) | |
| *C22B 7/02* | (2006.01) | |
| *C22B 43/00* | (2006.01) | |
| *B03D 1/006* | (2006.01) | |
| *B03D 1/008* | (2006.01) | |

(52) U.S. Cl.
CPC .............. *C22B 43/00* (2013.01); *B03D 2201/02* (2013.01); *C04B 18/08* (2013.01); *B03D 2201/04* (2013.01); *C22B 7/02* (2013.01); *B03D 2201/007* (2013.01); *B03D 2203/08* (2013.01); *B03D 1/006* (2013.01); *B03D 1/008* (2013.01); *Y10S 106/01* (2013.01)
USPC ....................... 106/705; 106/DIG. 1; 423/210

(58) Field of Classification Search
CPC ................................ C04B 18/08; B01D 47/00
USPC ................................. 106/705, DIG. 1; 423/210
See application file for complete search history.

(56) References Cited

U.S. PATENT DOCUMENTS

| | | |
|---|---|---|
| 4,426,282 A | 1/1984 | Aunsholt |
| 4,592,834 A | 6/1986 | Yang |

(Continued)

FOREIGN PATENT DOCUMENTS

EP   2 103 575 A1   9/2009

OTHER PUBLICATIONS

Giulio Belz and Pompilio Caramuscio, "Production of High Value Coal Fly Ash".

(Continued)

*Primary Examiner* — Paul Marcantoni
(74) *Attorney, Agent, or Firm* — Kirton McConkie; Evan R. Witt

(57) ABSTRACT

A method of producing enhanced coal combustion ash for use in pozzolanic applications or cement manufacture, in which the enhanced combustion ash has lower mercury content. A slurry is formed of the combustion ash and water and is subjected to froth flotation to form a mercury-enriched ash slurry and a mercury-depleted ash slurry. The product mercury-depleted ash slurry is isolated and may optionally be dried. The combustion ash may be pulverized prior to being used to form the slurry, reducing its mean particle size. The mercury-depleted combustion ash product has reduced levels of mercury and ammonia, and reduced particle size.

31 Claims, 1 Drawing Sheet

(56) References Cited

U.S. PATENT DOCUMENTS

| | | | |
|---|---|---|---|
| 5,005,773 | A | 4/1991 | Nyberg et al. |
| 5,244,492 | A | 9/1993 | Cyr |
| 5,318,228 | A | 6/1994 | Macas |
| 6,290,066 | B1 | 9/2001 | Hwang |
| 7,217,401 | B2 * | 5/2007 | Ramme et al. ............... 423/210 |

OTHER PUBLICATIONS

Javed I. Bhatty, John Gajda, Francois Botha and Mark M. Bryant, "Utilization of Discarded Fly Ash as a Raw Material in the Production of Portland Cement," Journal of ASTM International, vol. 3, No. 10, (2006), pp. 1-14.

Daniel Crowley, "Cement Kiln Mercury Reduction Strategies a Case Study in Materials Management," Titan America LLC, Medley Florida.

Barnabas Csoke, Gabor Mucsi and Csaba Sik, "Mechanical Activation of Deposited Fly Ash by Grinding," Recycling and Waste Processing: Materials Recovery from Wastes; Batteries and Co/Ni; Precious Metals Recovery; and Other NonFerrous, TMS (The Minterals, Metals & Materials Society), (2007), pp. 29-36.

John Groppo, Thomas Robl and James C. Hower, "The beneficiation of coal combustion ash," R. Giere & P. Stille (eds) 2004 Energy, Waste, and the Environment: a Geochemical Perspective; Geological Society, London, Special Publications, vol. 236, (2004), pp. 247-261, XP008135023.

Guy H. Harris and Renhe Jia, "An Improved class of flotation frothers," International Journal of Mineral Processing 58 (2000), pp. 35-43.

Linda M. Hills and Richard W. Stevenson, "Mercury and Lead Content in Raw Materials," Research & Development Information, PCA R&D Serial No. 2888 (2006).

J.Y. Hwang, X. Sun and Z. Li, "Unburned Carbon from Fly Ash for Mercury Adsorption: I. Separation and Characterization of Unburned Carbon," Journal of Minerals & Materials Characterization & Engineering, vol. 1, No. 1, (2002), pp. 39-60.

M. Niewiadomski, J. Hupka, R. Bokotko and J.D. Miller, "Flotation of Fine Coke Particles from Fly Ash," Fizykochemiczne Problemy Mineralurgii, 31 (1997), pp. 221-228, XP-002630443.

G. Para, K. Volke, A. Pomianowski and J. Pawlikowska-Czubak, "Surface activity and mercury flotation in solutions of n-dodecanoic acid and n-dodecylamine," Publ.-No. 811 from Research Institute of Mineral Processing, Academy of Sciences of the German Domocratic Republic, Freidberg, Colloid and Polymer Science, vol. 264, No. 3, (1986).

Hao Wang, Heng Ban, Dean Golden and Ken Ladwig, "Ammonia Release Characteristics from Coal Combustion Fly Ash," Fuel Chemistry Division Preprints (2002), 47(2), pp. 836-798.

* cited by examiner

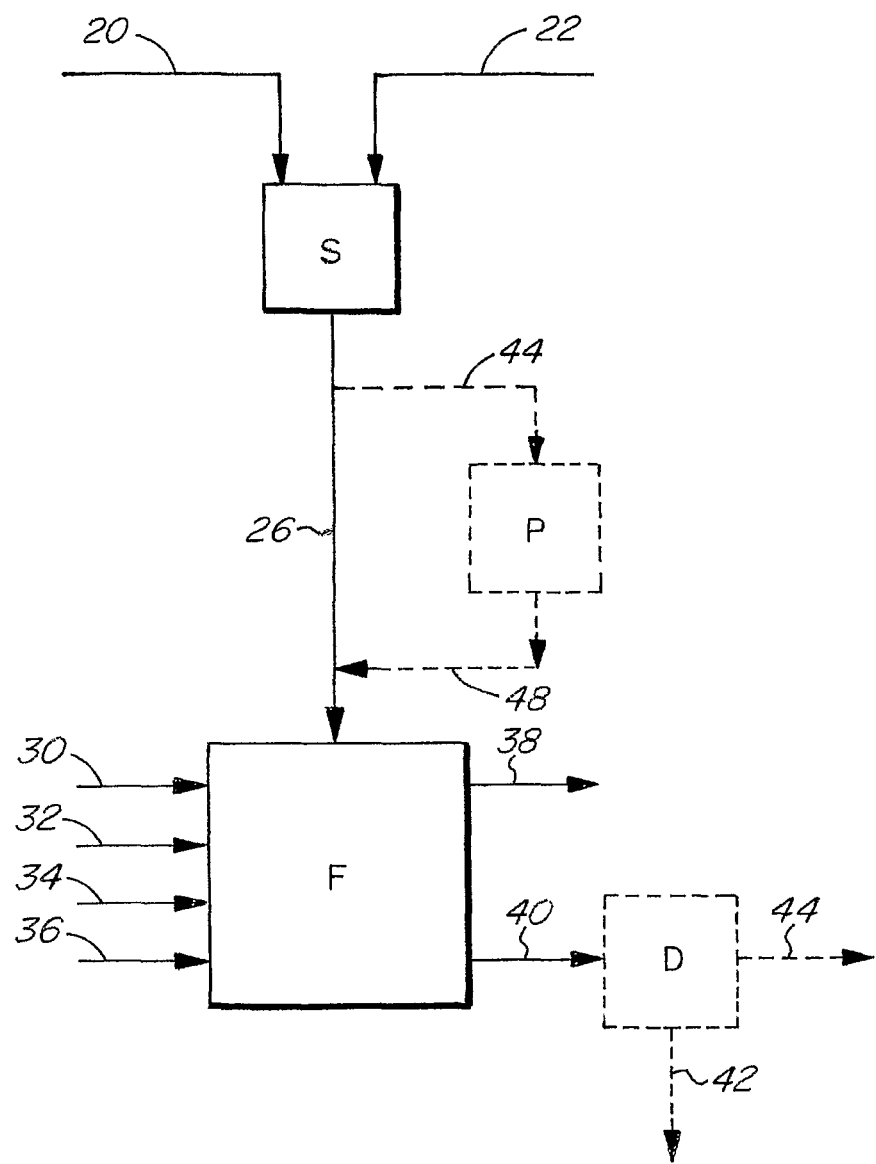

METHOD FOR UPGRADING COMBUSTION ASH

FIELD OF THE INVENTION

The invention pertains to methods of upgrading combustion ash, particularly coal combustion ash, for applications such as use as a pozzolanic additive for blended cement or as cement kiln raw material for cement clinker manufacture.

BACKGROUND OF THE INVENTION

It is known in the art of cement manufacture that combustion ash, particularly bituminous coal fly ash, is a useful additive in the making of cements, by virtue of its pozzolanic properties. A pozzolan is a material which, when combined with calcium hydroxide released by cement (e.g. Portland cement) during its hydration with water, exhibits cementitious properties in the presence of water. Pozzolanic ash, such as class F bituminous fly ash, can be used as a component of blended cements if it meets certain quality specifications (e.g. ASTM C618).

The technical benefits to be gained from addition of such materials to blended cements include reduced use of Portland cement per unit volume of mortar or concrete, increased strength and reduced water permeability of the mortar or concrete. Economic benefits arise from the reduction in the amount of Portland cement used, the higher quality of the mortar or concrete produced and the minimization of coal fly ash sent to landfill.

The value of bituminous coal fly ash as a pozzolan is enhanced by reducing its particle size, which increases the surface area and reactivity of silica and siliceous materials towards the free calcium hydroxide generated by hydration of Portland cement, reduces water porosity and increases the compressive strength of the resulting concrete. Reducing the ammonia content of bituminous fly ash also increases its value as a pozzolan since little or no gaseous ammonia is released when the ammonia-depleted ash is added to cement clinker and water to make blended cement, mortar or concrete.

It is also known that the reduction of overall particle size distribution of aluminosilicate raw materials for cement kilns, including bituminous fly ash, enhances cement kiln throughput. Bhatty et al., in "Utilization of Discarded Fly Ash as a Raw Material in the Production of Portland Cement," *Journal of ASTM International*, Vol. 3, No. 10 (2006), partially attributed a 9.7% increase in cement clinker production to lower particle size of coal fly ash as compared to conventional shale aluminosilicate input.

However, the high mercury content of bituminous fly ash relative to shale or clay dramatically reduces its acceptance as a cement kiln raw material. The only cement kiln raw material having a mean mercury content higher than coal fly ash is recycled cement kiln dust: Portland Cement Association, *PC R&D Serial No.* 2888, (2006). The high mercury content, in view of regulations governing mercury emissions from cement kiln operations, is recognized as an impediment to combustion ash usage in cement manufacture: Daniel Crowley, "Cement Kiln Mercury Reduction Strategies A Case Study in Materials Management," *Cement Industry Technical Conference*, (2010).

Accordingly, there exists a need for practical, economical, large-scale processes that can upgrade combustion ash, especially bituminous coal fly ash, by reducing its mercury content.

SUMMARY OF THE INVENTION

The present inventors have determined that wet froth flotation is able to dramatically reduce the mercury content of pozzolanic combustion ash, especially bituminous combustion ash. Moreover, when pulverization of the ash is carried out before wet froth flotation, mercury reduction is further enhanced, mercury-depleted ash recovery from flotation is improved, and the value of the ash is increased as a pozzolanic or cement kiln raw material, due to reduced particle size and dramatically reduced mercury content.

In one embodiment, the invention provides a method for reducing the mercury content of pozzolanic combustion ash. A slurry is formed of the combustion ash and water and is subjected to froth flotation to form a mercury-enriched ash slurry and a mercury-depleted ash slurry. The product mercury-depleted ash slurry is separated from the mercury-enriched ash slurry.

In some embodiments of the invention, the method also includes the step of pulverizing the combustion ash to reduce the mean particle size of the combustion ash, especially in the form of a slurry before subjecting it to froth flotation.

The invention further provides methods for reducing the ammonia content of pozzolanic combustion ash, such that the levels of both mercury and ammonia in the combustion ash are reduced.

The invention further provides mercury-depleted combustion ash slurry, and partially dried and fully dried combustion ash, made by the foregoing methods. Pozzolanic applications for these products include, for the wet mercury-depleted ash slurry, use in wet cement kilns, mortar or concrete. The dried mercury-depleted ash product is useful in dry cement kilns for cement clinker manufacture.

Further aspects of the invention and features of specific embodiments are described below.

BRIEF DESCRIPTION OF THE DRAWING

FIG. 1 is a schematic diagram of an embodiment of the invention.

DETAILED DESCRIPTION

Combustion ash for use in the process of the invention can be any kind of pozzolanic combustion ash, in particular coal combustion ash, having a mercury content such that it is desirable to reduce the mercury content for use of the combustion ash in pozzolanic applications or cement clinker manufacture. An example is bituminous coal combustion ash, especially bituminous coal fly ash. The combustion ash may include ammonia in addition to the mercury.

Referring to FIG. 1, in which optional steps are indicated in broken lines, a combustion ash slurry is formed by mixing combustion ash (stream 20) and water (stream 22) in a slurry mixing tank S. The combustion ash slurry (stream 26) is fed into a conventional froth flotation apparatus F.

The froth flotation is operated so as to render the mercury hydrophobic by the use of a suitable collector chemical, in order to separate it into the froth. The collector may be hydrophobic, or hydrophobic and slightly hydrophilic. Kerosene, or a mixture of kerosene and tall oil, are examples of suitable collectors. During the froth flotation step, water (stream 30), the collector (stream 32) and a frothing agent (stream 34) are added as required. Optionally, acid (stream 36) may be added. The conventional processing parameters of froth flotation, well known in the art and including flotation cell volume, pH control, impeller speed, aeration flow rate, collector type and ratio, frothing agent type and ratio, mixture temperature, pulp density, length of ash conditioning period i.e. reagent mixing time, and length of aeration, i.e. froth collection time, are selected and controlled according to the requirements for a particular application. The froth flotation step may be single-stage or multi-stage.

The pH of the combustion ash slurry in the froth flotation cell may be adjusted to optimize the yield of mercury-reduced ash. The pH of combustion ash varies greatly and may be alkaline or acidic. An alkaline ash slurry having, for example, a pH of about 8, may be acidified in the flotation cell to a pH of about 4, or in the range of 3.5-4.5, or 3.8-4.2, by addition of acid, e.g. sulphuric acid. The flotation process works better at low pH. However, if the ash rejects from the process are to be discharged to an unlined landfill, the pH may be adjusted upward in the flotation cell.

The froth flotation process separates the combustion ash slurry into a mercury-enriched combustion ash slurry (i.e. having a higher concentration of mercury than the input combustion ash slurry) and a mercury-depleted combustion ash slurry (i.e. having a lower concentration of mercury than the input combustion ash slurry). The mercury-enriched ash slurry is removed from the flotation cell as froth product (stream 38) and is sent to a froth collector to be discarded or further processed. The mercury-depleted ash slurry is removed (stream 40) and is allowed to separate from excess water. The process is effective in removing both oxidized and elemental mercury, both forms of mercury being present in combustion ash.

Optionally, the mercury-depleted ash slurry may be sent to a dryer D, where water is partly or completely removed (stream 42), leaving partly or completely dried mercury-depleted ash product (stream 44). Drying may be done, for example, by means of centrifuging the slurry to partially dry it, or centrifuging followed by oven drying at 105° C. for 24 hours to fully dry it. The drying step would be omitted if the mercury-depleted ash slurry is to be used in a wet cement kiln.

Optionally, the combustion ash may be pulverized before being subjected to froth flotation. In this embodiment of the process, instead of feeding it directly to the froth flotation apparatus F, the combustion ash slurry (stream 44) is fed to a pulverizer P. Pulverizing the combustion ash reduces its mean particle size and has been determined to enhance the flotation yield of product mercury-depleted ash slurry. Any suitable pulverizing apparatus can be used. For example, the pulverizer may be an acoustic frequency sonicator of the type described by Nyberg et al., U.S. Pat. No. 5,005,773, having pulverization chambers which contain grinding media, and which are commercially available from Sonoro Energy Ltd. of Vancouver BC. Such a pulverizer may be operated using a grinding medium such as zirconium oxide beads of 2 mm diameter or less, an operating frequency of 50-400 Hz, and a pulverization time of 30 seconds or less, alternatively 15 seconds or less. The acoustic frequency sonicator pulverizer may be operated in batch mode or, preferably, in continuous mode as described in Macas, U.S. Pat. No. 5,318,228, using screens on the grinding chambers to retain the grinding media within them.

The pulverized combustion ash (stream 48) is then fed to the froth flotation apparatus F and the process continues as described above.

In an alternative embodiment (not shown in the drawing) the combustion ash is pulverized in dry form and is then fed to the slurry mixing tank, and the slurry is then subjected to froth flotation as described above.

Example 1

Samples of bituminous coal fly ash A having 250 parts per billion mercury, 28.6 micron mean particle size and a pH of 8.4 were subjected to froth flotation. The flotation conditions were: 1200 rpm impeller speed; 10 liters per minute aeration flow rate, i.e. 1.09 liters air/liter of pulp/minute; kerosene and tall oil (from pine) as collector, 0.004 grams kerosene per gram fly ash, 0.004 grams tall oil per gram fly ash; 0.002 grams Dowfroth 250-C (1-(1-methoxypropan-2-yloxy)propan-2-ol) per gram of fly ash as frothing agent; 10% pulp density (dry mass of ash/mass of ash slurry); slurry temperature 35° C.; 9.2 L flotation cell; no pH adjustment; 5 minute conditioning period; 20 minute aeration period.

One sample was not pulverized before froth flotation and other samples were pulverized in batch mode or continuous mode using an acoustic frequency sonicator. After froth flotation, the mean particle size, mercury content and yield of the product mercury-depleted ash slurry were measured. The results are shown in Table 1.

TABLE 1

Batch Flotation Data (Non-acidified Flotation Slurry)

|  | Unpulverized | Pulverized | |
| --- | --- | --- | --- |
|  |  | Batch | Continuous |
| Pulverization time (seconds) | 0 | 15 | 2.7 | 15 |
| Mean particle size (microns) | 28.4 | 11.6 | 25.0 | 17.2 |
| Mercury Content (ppb) | 40 | <20 | 20 | <20 |
| Yield (Mass %) | 52.3 | 65.9 | 54.9 | 64.5 |

The notation "<20" in Table 1 indicates a mercury content less than the detection limit of the testing equipment, namely 20 ppb.

The results show that froth flotation of the combustion ash dramatically reduces the mercury content, and that initial pulverization enhances the reduction.

Example 2

Samples of bituminous fly ash A as in Example 1 were processed under the same conditions except that the pH of the ash slurry was adjusted to pH 4 by adding 0.0037 grams sulphuric acid per gram fly ash to the flotation cell. The results are shown in Table 2.

TABLE 2

Batch Flotation Data (Acidified Flotation Slurry)

|  | Unpulverized | Pulverized | |
| --- | --- | --- | --- |
|  |  | Batch | Continuous |
| Pulverization time (seconds) | 0 | 15 | 2.7 | 5 |
| Mean particle size (microns) | 21.0 | 9.4 | 19.1 | 18.2 |
| Mercury Content (ppb) | 30 | <20 | <20 | <20 |
| Yield (Mass %) | 69.3 | 75.1 | 69.8 | 73.1 |

The results demonstrate that acidification of the ash increases the yield of mercury-depleted ash slurry.

Example 3

Raw unsieved class F bituminous coal fly ash B containing 205 ppb mercury and 192 parts per million available ammonia nitrogen was wet pulverized in an acoustic frequency 3 liter sonication chamber for 3 minutes under the following conditions: 8.8 kg of 1.18 mm steel shot pulverization media, 0.6 kg of water, and 0.85 kg of raw bituminous fly ash, resulting in a chamber void volume of 23%.

The available ammonia nitrogen content after pulverization was 2.67 ppm, thus achieving a 98.6% reduction. The pulverized fly ash was then subjected to wet froth flotation as described in Example 1. There was a further reduction of available ammonia nitrogen to 1.86 ppm, or 99% reduction overall.

Throughout the foregoing description and the drawing, specific details have been set forth in order to provide a more thorough understanding to persons skilled in the art. However, well known elements may not have been shown or described in detail to avoid unnecessarily obscuring the disclosure. The description and drawing are to be regarded in an illustrative, rather than a restrictive, sense.

As will be apparent to those skilled in the art in the light of the foregoing disclosure, many alternations and modifications are possible in the practice of this invention without departing from the scope thereof. The scope of the invention is to be construed in accordance with the following claims.

What is claimed is:

1. A method of reducing the mercury content of pozzolanic combustion ash, comprising the steps of:
   (a) forming a slurry of the combustion ash and water;
   (b) pulverizing the combustion ash before or after step (a);
   (c) subjecting the ash slurry having pulverized combustion ash to froth flotation to form a mercury-enriched ash slurry and a mercury-depleted ash slurry; and
   (d) separating the product mercury-depleted ash slurry from the mercury-enriched ash slurry.

2. A method according to claim 1, wherein the step of pulverizing is done after step (a).

3. A method according to claim 1, wherein the step of pulverizing is done before step (a).

4. A method according to claim 1, wherein the froth flotation includes adjusting the pH of the ash slurry.

5. A method according to claim 4, wherein the pH adjustment is pH reduction.

6. A method according to claim 5, wherein the pH is reduced to a pH in the range of 3.5-4.5.

7. A method according to claim 5, wherein the pH is reduced using sulphuric acid.

8. A method according to claim 1, wherein the pH of a frothing liquor used in the froth flotation is reduced to a pH in the range of 3.5-4.5.

9. A method according to claim 1, wherein the froth flotation is done without pH adjustment.

10. A method according to claim 1, wherein a collector used in the froth flotation is hydrophobic.

11. A method according to claim 10, wherein the hydrophobic collector is kerosene.

12. A method according to claim 1, wherein a collector used in the froth flotation is hydrophobic and slightly hydrophilic.

13. A method according to claim 12, wherein the hydrophobic and slightly hydrophilic collector is tall oil.

14. A method according to claim 1, wherein a frothing agent is used in the froth flotation.

15. A method according to claim 1, wherein step (c) comprises controlling the ash slurry pulp density.

16. A method according to claim 1, wherein step (c) comprises controlling the flotation cell volume, impeller speed, aeration flow rate, flotation slurry temperature, acid dosage, collector dosage, frothing agent dosage, reagent conditioning time and aeration time.

17. A method according to claim 1, wherein step (d) comprises removing a froth containing the mercury-enriched ash slurry.

18. A method according to claim 1, wherein the step of pulverizing is carried out in batch mode.

19. A method according to claim 1, wherein the step of pulverizing is carried out in continuous mode.

20. A method according to claim 1, wherein the step of pulverizing is carried out in the presence of grinding media.

21. A method according to claim 20, wherein the grinding media comprises beads having a diameter of 2 mm or less.

22. A method according to claim 20, wherein the grinding media is zirconium oxide.

23. A method according to claim 1, wherein the step of pulverizing comprises controlling the mass ratio of grinding media to combustion ash, and the pulverization time.

24. A method according to claim 23, wherein the mass ratio is greater than 1.

25. A method according to claim 24, wherein the mass ratio is greater than 10.

26. A method according to claim 1, wherein the step of pulverizing is carried out in a chamber to which acoustic frequency sonic ation is applied.

27. A method according to claim 1, wherein the combustion ash is coal combustion ash.

28. A method according to claim 27, wherein the coal combustion ash is bituminous coal combustion ash.

29. A method according to claim 28, wherein the bituminous coal combustion ash is fly ash.

30. A method according to claim 1, wherein the combustion ash contains ammonia and the method reduces the ammonia content such that the mercury-depleted ash slurry of step (d) has a lower ammonia level than the ash slurry of step (a).

31. A method according to claim 1, further comprising, after step (d), the step of partly or completely drying the product mercury-depleted ash slurry.

\* \* \* \* \*